United States Patent [19]

Czech et al.

[11] Patent Number: 4,591,655
[45] Date of Patent: May 27, 1986

[54] METAL-ENCAPSULATED GAS-INSULATED HIGH-VOLTAGE LINE

[75] Inventors: Franz Czech, Niederhasli; Carl D. Flöessel, Fislisbach, both of Switzerland

[73] Assignee: BBC Brown, Boveri & Company Ltd., Switzerland

[21] Appl. No.: 645,006

[22] Filed: Aug. 28, 1984

[30] Foreign Application Priority Data

Aug. 31, 1983 [CH] Switzerland .......................... 4777/83

[51] Int. Cl.[4] ............................................ H02G 15/24
[52] U.S. Cl. .................. 174/22 C; 174/21 C; 174/28
[58] Field of Search ..................... 174/21 C, 22 C, 28

[56] References Cited

U.S. PATENT DOCUMENTS

| | | | |
|---|---|---|---|
| 3,814,831 | 6/1974 | Olsen | 174/22 C X |
| 3,906,149 | 9/1975 | Hashoff et al. | 174/28 X |
| 4,105,859 | 8/1978 | Cookson et al. | 174/28 X |
| 4,288,652 | 9/1981 | Kemeny et al. | 174/21 C |

FOREIGN PATENT DOCUMENTS

| | | | |
|---|---|---|---|
| 2624908 | 12/1977 | Fed. Rep. of Germany | 174/22 C |
| 58885 | 5/1979 | Japan | 174/28 |
| 157287 | 12/1979 | Japan | 174/28 |
| 476379 | 9/1969 | Switzerland | 174/28 |

Primary Examiner—Arthur T. Grimley
Assistant Examiner—Morris H. Nimmo
Attorney, Agent, or Firm—Ostrolenk, Faber, Gerb & Soffen

[57] ABSTRACT

A high-voltage line which includes a conductor supported in a metal encapsulation which is filled with insulating gas and which consists of pipe sections, the ends of which are welded together in a gas-tight manner at specially formed annular mating surfaces. A high-voltage conductor in the interior of the metal encapsulation is supported on partitioning insulators which divide the metal encapsulation into axially spaced cylindrical spaces. Between every two partitioning insulators one or more support insulators are arranged, each of which is located in a distinctly formed annular space. The body of the support insulator is comprised of insulating material having openings in it. The mating surfaces of the two pipe ends are separated by a V-shaped annular gap and are welded together by a welding seam which fills the annular gap. The welding seam has a root which extends annularly and which is electrically in contact with the metallic outer edge of the partitioning insulator or support insulator.

9 Claims, 6 Drawing Figures

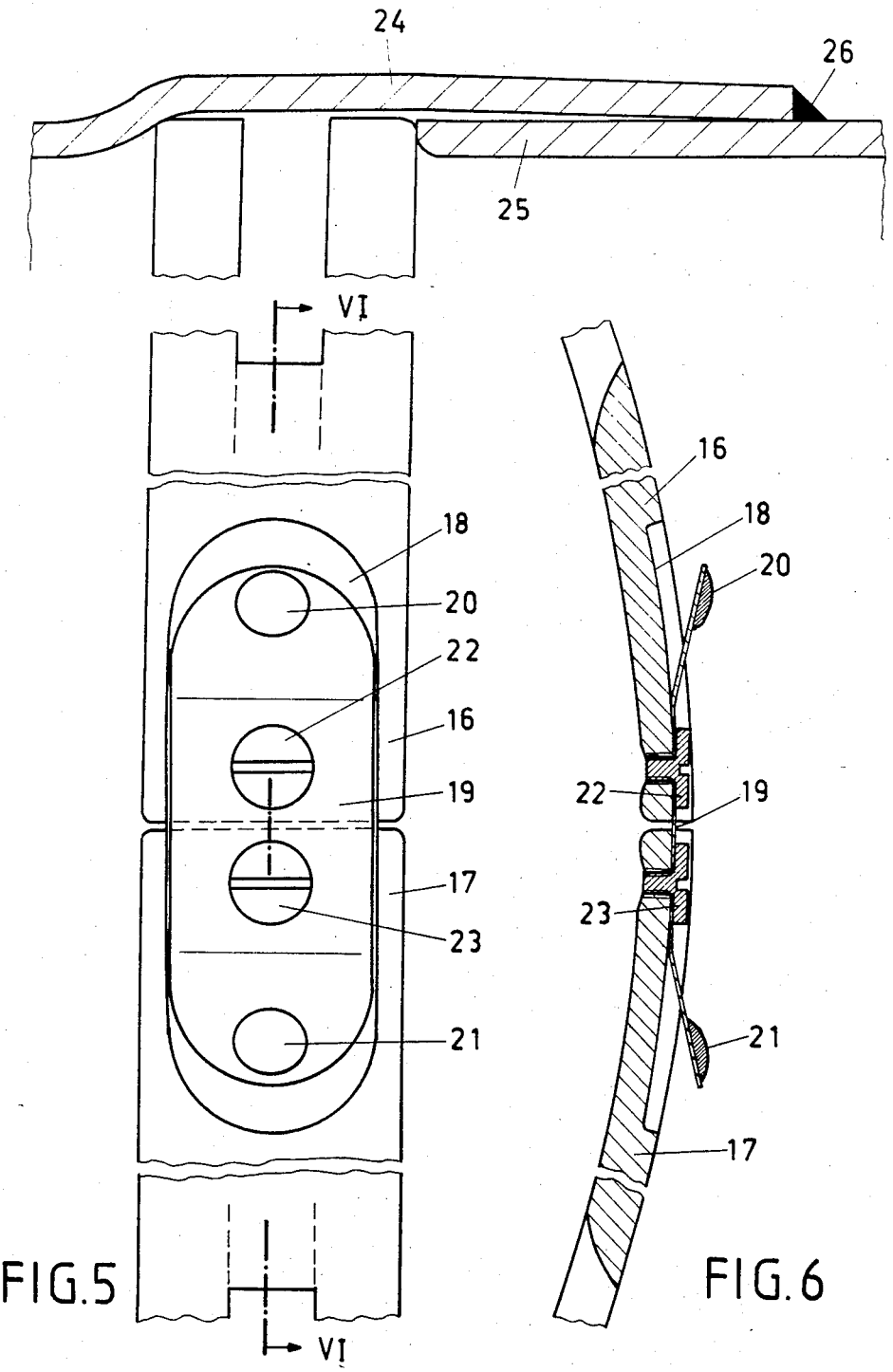

METAL-ENCAPSULATED GAS-INSULATED HIGH-VOLTAGE LINE

BACKGROUND OF THE INVENTION

The present invention relates to a high-voltage line.

A high-voltage line is known, for example, from German Offenlegungsschrift No. 1,934,812. In the known high-voltage line, insulators of disc-shaped design support a high-voltage conductor which is arranged inside a metal encapsulation. The disc insulators subdivide the interior space of the metal encapsulation into spaces which are partitioned from each other in a gas-tight manner. Should a flash-over occur in any of the spaces, the resulting arc travels, in response to electrical fields created by the current in the conductor, to one of the disc insulators where the arc stops. The parts of the metal encapsulation which support the disc insulators must have walls of considerable thickness in order to prevent the arc, which is localized at a given insulator, from burning through the metal before the arc is extinguished.

SUMMARY OF THE INVENTION

It is an object of the present invention to provide cost-effective high-voltage line which can be field assembled in a relatively simple manner even under aggravated conditions and which is also highly reliable.

The foregoing and other objects are achieved by the high voltage line of the present invention which is distinguished in that, as a result of the use of insulators which are suitably arranged and mounted, arc-resistant encapsulation parts are required only at two relatively widely spaced locations of the metal encapsulation to reliably prevent the arcs which occur in a given space of the metal encapsulation from burning through. In addition, the high-voltage line can be easily assembled in a reliable manner even under difficult assembly conditions because the pipe sections of the metal encapsulation which are welded together at the assembly site are of predominantly similar construction.

BRIEF DESCRIPTION OF THE DRAWING

An illustrative embodiment of the invention is explained with greater detail with the aid of the drawing, in which:

FIG. 5 shows an alternative embodiment of the arrangement shown in FIG. 3, and FIG. 6 shows a top view of a section along line VI—VI through the embodiment of FIG. 5.

DETAILED DESCRIPTION OF PREFERRED EMBODIMENT

Figure 1:
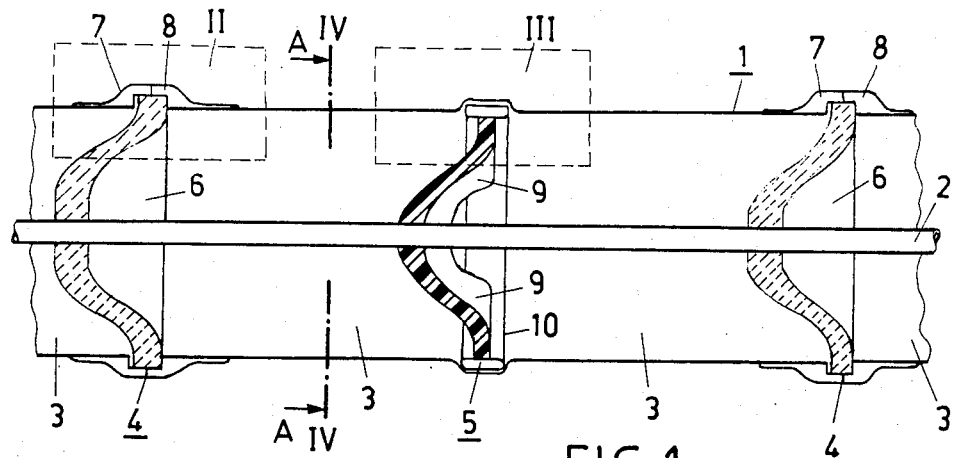
FIG. 1 shows a top view of a section through a part of a high-voltage line constructed in accordance with the invention.

In all figures, identical parts are referenced by identical reference designations. In FIG. 1, a part of a high-voltage line, constructed in accordance with the invention, is shown in section along a metal encapsulation 1 filled with insulating gas, such as sulphur hexafluoride, and a high-voltage-carrying conductor 2. The metal encapsulation 1 is constructed of pipe sections 3 of conductive material such as, for example, aluminium, with a wall thickness of between 4 and 5 mm. These pipe sections 3 are welded together in a gas-tight manner and provide a particularly good resistance to open-air conditions in this high-voltage line. The high-voltage-carrying conductor 2 is supported on partitioning insulators 4 and one or more support insulators 5 are arranged between two partitioning insulators 4.

The partitioning insulators 4 contain disc- or funnel-shaped bodies 6 of insulating material which subdivide the interior of the metal encapsulation 1 into spaces which are partitioned from each other. The outer edge of the partitioning insulators 4 is supported in welding flanges 7 and 8 of pipe sections 3. Compared to the pipe sections 3, the thickness of the flanges 7 and 8 is much higher, for example, 10 to 20 mm. The result is that an arc, which may have ignited in one of the spaces, cannot leave this space since it is conducted, by the action of the current flowing in the conductor 2, to one of the partitioning insulators 4 where it stops. Because of the fact that the wall thickness of the metal encapsulation 1 is relatively great in the area of the partitioning insulators 4, even a long lasting arc will not burn through the metal encapsulation before an adjacent switch switches off the current flowing in the conductor 2.

The support insulator 5, of which several may be placed intermediate of the partitioning insulators, contains a disc-shaped body of insulating material which has recesses to form three legs 9 which are located approximately 120° apart. The ends which point outwardly of the legs 9 are supported in an armoring ring 10 which is itself supported by the inside wall of the metal encapsulation 1.

To the bodies of insulating material of the partitioning insulators 4 and support insulators 5, control electrodes, not shown, are mounted in the area of the metal encapsulation 1 and the conductor 2. By means of the electrodes the electric field along the surface of the respective body of insulating material is controlled.

Figure 2:
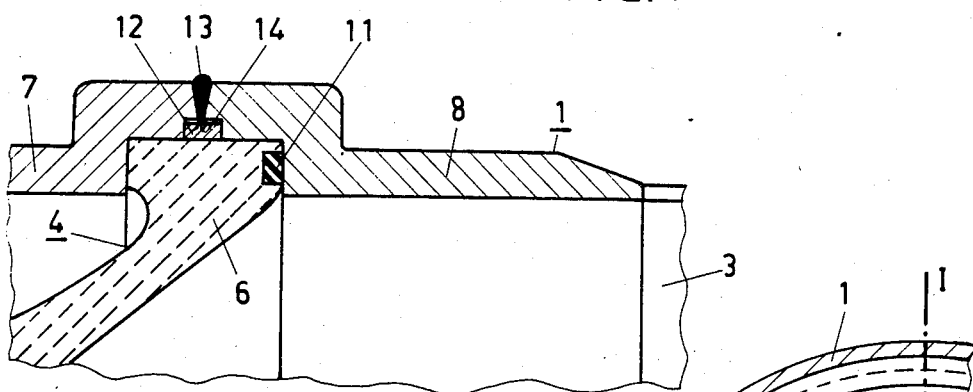
FIG. 2 shows an enlargement of a section II from the high-voltage line of FIG. 1.
Figure 3:
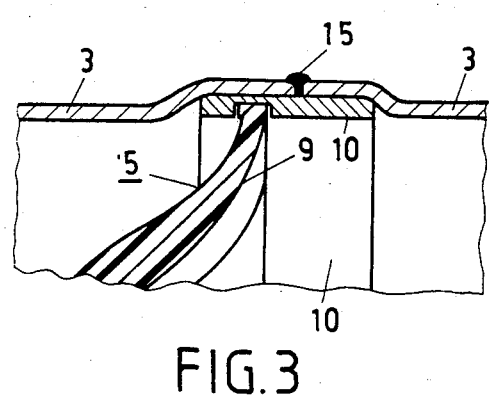
FIG. 3 shows an enlargement of a section III from the high-voltage line of FIG. 1.

The support points of the partitioning insulators 4 and of the support insulator 5 are illustrated in the enlargements of the sections II and III FIG. 1 and are shown in FIGS. 2 and 3, respectively.

According to FIG. 2, the outer edge of the body 6 of insulating material of one of the partitioning insulators 4 is supported, by an interposed O-ring 11, in an annular recess formed by two welding flanges 7 and 8 of the pipe sections 3. At the outer edge of the insulating body 6, an armoring ring 12 molded onto the body 6 which forms a control electrode. The ring 12 additionally supports the partitioning insulator 4. The facing faces of the two flanges 7 and 8 are bevelled so that between them an annular V-shaped gap formed when the two parts 7 and 8 are brought together upon installation of the partitioning insulator 4. This annular gap is filled with a welding seam 13 which connects the two flanges 7 and 8 in a gas-tight manner. Since the two flanges 7 and 8 are constructed in a similar manner, the welding seam 13 can be applied in a simple but qualitatively high-grade manner even under difficult conditions, for example at the site of installation of the high-voltage line. The risk of welding through the metal encapsulation is prevented since the welding seam 13 forms a narrow root 14 which extends annularly around and on the armoring ring 12. This achieves both a good electric connection between the metal encapsulation 1 and the armoring ring 12 which creates a potential bridge between the encapsulation 1 and the armoring ring 12, which acts as a control electrode and also coronae are reliably prevented.

Figure 4:
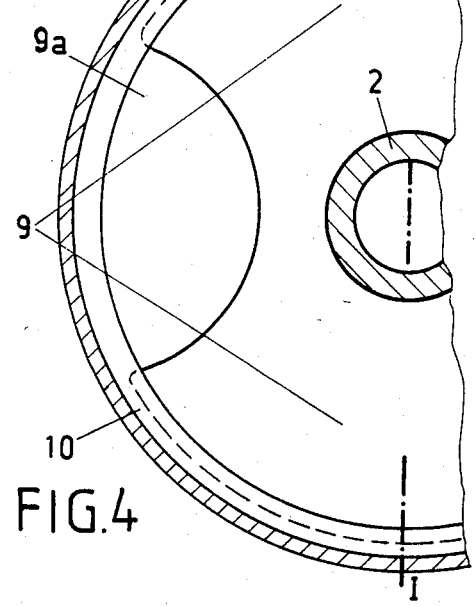
FIG. 4 shows a top view in the direction of arrows A of a section, shown enlarged, along line IV—IV through the high-voltage line of FIG. 1.

The legs 9, separated from each other by recesses 9a, of the body of insulating material of the support insulator 5 are supported as shown in FIG. 3 and FIG. 4 in an expanded part of the metal encapsulation 1. The legs are formed by similarly expanding and by welding together the ends of two pipe sections 3. The faces opposite to each other of the two expanded pipe section ends are chamfered, similarly as at the end pieces 7, 8. During the assembly of the high voltage line, after the two pipe sections 3 are brought together, the opposite faces form an annular gap with a V contour which can also be root-welded in a simple manner at the assembly site. Since the annular root, of the seam 15 formed during the welding of the ends is on the outer surface of the moulded-in ring 10 supporting the legs 9 of the support insulator 5, damage caused by welding, otherwise possible considering the relatively thin-walled pipe sections 3, is made impossible during assembly of the pipe section with a high degree of reliability. Simultaneously, a reliable potential link from the outer ends of the legs 9 to the metal encapsulation 1 is provided. An arc, which may occur in the space bounded by the partitioning insulators 4, can pass through the support insulator 5 because of the openings in the material provided between the legs 9 so that the risk of burning through the metal encapsulation 1 as a result of a sustained arc is prevented in the area of the support insulator 4 despite the fact that the metal encapsulation is constructed of thin walls.

Instead of using an armoring ring 10 constructed as an integral molded-in ring, it may be preferable to construct the armoring ring, as shown in FIGS. 5 and 6, of segments 16 and 17 which are distributed peripherally to form the ring. Two adjacent segments 16 and 17 of such an armoring ring are used for supporting one of the legs 9 of the support insulator 5. The outer surface of the segments 16, 17 is provided with a recess 18 into which a contact spring 19 is fitted. The contact spring 19 is supported with two contact pieces 20 and 21 on the inside of the metal encapsulation 1. The contact spring 19 connects, via screws 22 and 23, the two segments 16 and 17 along the periphery of the support insulator 5. By similarly connecting all adjacent segments, an armoring ring is produced which is easy to assemble and which includes contact elements which produce a potential equalisation between the support insulator 5 and the metal encapsulation 1.

A support insulator supported by an armoring ring, as described above, can be located, if required, in a differently formed expanded section of the metal encapsulation 1 which is formed by expanding only one pipe section 24 and fitting it over the other section 25. Installation of the support insulator 5 and insertion of a second pipe section 25 will not cause undesirable jamming and thus the risk of damage of the usually epoxy-resin containing legs 9. Also, the fillet-weld seam 26 drawn during the gas-tight welding of the two pipe sections 24 and 25 must be positioned in such a manner that a possible welding through or damage to the pipe 25 can be observed from the open side of the high-voltage line.

We claim:
1. A high voltage line comprising:
an elongated metal encapsulation including a plurality of pipe sections which are arranged end to end and welded to one another, each pipe section having respective annular first and second mating extensions at each end thereof, the mating extensions defining an enlarged diameter annular space in the encapsulation at the juncture between adjacent pipe sections, the pipe wall thickness of said metal encapsulation being larger at said mating extensions than the thickness thereof at other locations of said pipe sections, each mating extension being bevelled so that a V-shaped annular groove is formed between said adjacent pipe sections, said V-shaped groove being filled with a welding seam, and at least one increased diameter annular section in each one of said pipe sections between said first and second mating extensions of said pipe sections;
an electrical conductor which extends through said metal encapsulation coaxially with an axis of said metal encapsulation;
a plurality of partitioning insulators, each partitioning insulator being located in said metal encapsulation and at a respective one of said enlarged diameter annular spaces defined by said adjacent pipe sections, each of said partitioning insulators forming an air-tight connection with said metal encapsulation, thereby to divide said metal encapsulation into a plurality of air-tight compartments, each of said partitioning insulators having an insulation body, said conductor passing through said insulation body of said partitioning insulators; and
a plurality of support insulators, each support insulator having a body of insulation material, at least one opening through said insulation body, and an annular periphery which is supported at said increased diameter annular section located between said mating extensions, said conductor passing through said plurality of support insulators, whereby arcs which may develop in said metal encapsulation are capable of passing through said at least one opening in said support insulators toward said mating extensions of said pipe sections which have a greater wall thickness, thereby to eliminate arc damage to said high voltage line.

2. The high voltage line of claim 1, wherein said insulation body of each of said partitioning insulator is conically shaped.

3. The high voltage line of claim 1, wherein said insulation body of each of said partitioning insulator is disc shaped.

4. The high voltage line of claim 1, wherein said insulation body of each one of said support insulators is disc shaped.

5. The high voltage line of claim 1, wherein said wall thickness of said pipe sections is between 4-5 millimeters.

6. The high voltage line of claim 5, wherein said wall thickness of said pipe section at said annular mating extensions is between 10-20 millimeters.

7. The high voltage line of claim 1, further comprising a respective armoring ring formed around and molded into the insulating body of each one of said partitioning insulators.

8. The high voltage line of claim 1, in which the insulation body of each one of said support insulators comprises at least two legs, and an armoring ring formed around said legs.

9. The high voltage line of claim 8, wherein said armoring ring comprises a plurality of ring segments which are joined together to form said armoring ring, said segments having an outer surface and a recess in said outer surface, a contact spring for joining adjacent segments to one another, said contact spring mating with said metal encapsulation at said increased diameter annular section thereof.

* * * * *